US011679869B2

(12) United States Patent
Webb (10) Patent No.: US 11,679,869 B2
(45) Date of Patent: Jun. 20, 2023

(54) LOW DRAG SURFACE

(71) Applicant: ROLLS-ROYCE plc, London (GB)

(72) Inventor: Simon P Webb, Derby (GB)

(73) Assignee: ROLLS-ROYCE plc, London (GB)

( * ) Notice: Subject to any disclaimer, the term of this patent is extended or adjusted under 35 U.S.C. 154(b) by 826 days.

(21) Appl. No.: 16/449,507

(22) Filed: Jun. 24, 2019

(65) Prior Publication Data

US 2020/0018333 A1 Jan. 16, 2020

(30) Foreign Application Priority Data

Jul. 12, 2018 (GB) ...................................... 1811422

(51) Int. Cl.
*B64C 23/02* (2006.01)
*F15D 1/12* (2006.01)
*B64C 21/02* (2006.01)

(52) U.S. Cl.
CPC ................ *B64C 23/02* (2013.01); *F15D 1/12* (2013.01); *B64C 21/025* (2013.01); *F05D 2220/32* (2013.01)

(58) Field of Classification Search
CPC .................................. B64C 23/02; F15D 1/12
See application file for complete search history.

(56) References Cited

U.S. PATENT DOCUMENTS

| | | | | |
|---|---|---|---|---|
| 1,674,169 A * | 6/1928 | Flettner | ..................... | B63H 9/02 440/37 |
| 1,785,300 A * | 12/1930 | Castelcicala | ............ | B64C 23/08 244/206 |
| 1,879,594 A * | 9/1932 | Serge | ....................... | B64C 23/08 244/206 |
| 1,932,532 A * | 10/1933 | Phillips | .................... | B64C 23/02 244/58 |
| 2,569,983 A * | 10/1951 | Favre | ...................... | B62D 35/00 244/206 |
| 2,852,211 A * | 9/1958 | Xenakis | ................... | B64C 23/02 244/203 |
| 3,448,714 A * | 6/1969 | Brooks | .................. | B63H 25/40 244/206 |
| 5,590,854 A * | 1/1997 | Shatz | ..................... | B64D 15/16 244/209 |

(Continued)

FOREIGN PATENT DOCUMENTS

DE 3534169 A1 3/1987
FR 614091 A 12/1926

(Continued)

OTHER PUBLICATIONS

Dec. 6, 2019 Extended European Search Report issued in European Patent Application No. 19181765.9.

(Continued)

*Primary Examiner* — Michael H Wang
(74) *Attorney, Agent, or Firm* — Oliff PLC (57) ABSTRACT

A low drag surface is provided for a fluid washed object, the low drag surface comprising an aerodynamic surface comprising a cut-out region, and a continuously translatable surface comprising a surface portion. The surface portion is positioned in the cut-out region such that the aerodynamic surface and the surface portion form a fluidwash surface, and the surface portion is translatable relative to the aerodynamic surface.

19 Claims, 8 Drawing Sheets

(56) References Cited

U.S. PATENT DOCUMENTS

| | | | | |
|---|---|---|---|---|
| 5,875,627 A * | 3/1999 | Jeswine | ................... | F04D 5/001 |
| | | | | 60/221 |
| 6,322,024 B1 * | 11/2001 | Garver | ................... | B63H 25/40 |
| | | | | 244/206 |
| 6,824,109 B2 * | 11/2004 | Garver | ................... | B64C 23/02 |
| | | | | 244/206 |
| 9,394,046 B2 * | 7/2016 | Garver | ................... | B64C 23/08 |
| 9,988,141 B2 * | 6/2018 | Garver | ................... | B64C 23/06 |
| 10,583,872 B1 * | 3/2020 | Chen | ................... | B62D 35/00 |
| 2002/0179777 A1 * | 12/2002 | Al-Gami | ................. | B64C 23/02 |
| | | | | 244/206 |
| 2016/0327073 A1 * | 11/2016 | Amlani | ................... | F15D 1/007 |
| 2017/0190437 A1 * | 7/2017 | Snyder | ................... | B64D 15/00 |
| 2018/0093751 A1 * | 4/2018 | Shi | ............................ | B64C 1/40 |

FOREIGN PATENT DOCUMENTS

| | | | |
|---|---|---|---|
| FR | 1053332 A | 2/1954 | |
| FR | 2168196 A1 | 8/1973 | |

OTHER PUBLICATIONS

Jan. 10, 2019 British Search Report issued in British Patent Application No. 1811422.3.

* cited by examiner

LOW DRAG SURFACE

CROSS-REFERENCE TO RELATED APPLICATIONS

This application is based upon and claims the benefit of priority from British Patent Application Number 1811422.3 filed 12 Jul. 2018, the entire contents of which are incorporated by reference.

BACKGROUND

1. Field of the Disclosure

The present disclosure concerns a low drag surface, a gas turbine engine comprising the low drag surface, a method of assembling a gas turbine engine and a method of operating a gas turbine engine.

2. Description of the Related Art

Drag exists when an object moves through a fluid. For example the relative velocities between the fluid and the surfaces of the object can cause aerodynamic losses on the moving object, for example as the relative velocities shear the fluid or cause flow disturbances. Energy is required by the object to overcome these losses and maintain its rate of movement. The faster the object moves through the fluid the more significant the losses become. The losses can be due to skin friction, i.e. the friction caused on the skin or surfaces of the object due to moving through the fluid. The losses can be due to flow disturbance, for example in the boundary layer.

Objects designed to travel through fluids must be designed to minimise the aerodynamic losses in order to be more efficient. Careful consideration of the design of surfaces of the object, for example their size and shape, must be given.

Gas turbine engines are an example of an object designed to travel through a fluid, i.e. air. The efficiency of a gas turbine engine is critical for a range of factors including economic viability and environmental impact. The design of the surfaces of gas turbine engines is therefore important in minimising aerodynamic losses and improving efficiency. This is especially true as the gas turbine engine, or localised parts of the gas turbine engine, may experience high Mach numbers during operation.

Existing methods for designing a surface of a moving object to minimise aerodynamic losses involve shaping the surface to be more aerodynamic, minimising the surface area of the surface, or improving the aerodynamic properties of the surface layer. However often design constraints restrict the selection of one or more of these options, and often the resultant design still impose significant aerodynamic losses on the moving object. Further, under certain operating conditions the design of the surface may cause, for example, non-uniform flow, that is difficult to avoid due to the design constraints. This non-uniform flow may exert unsteady forces on downstream parts of the product that the surface forms a part of, for example causing them to vibrate and potentially fail.

It is therefore desirable to have a low drag surface in design constrained situations.

SUMMARY

According to an aspect there is provided a low drag surface for a fluid washed object, the low drag surface comprising an aerodynamic surface comprising a cut-out region, and a continuously translatable surface comprising a surface portion. The surface portion is positioned in the cut-out region such that the aerodynamic surface and the surface portion form a fluidwash surface. The surface portion is translatable relative to the aerodynamic surface.

According to an aspect there is provided a product comprising the low drag surface as claimed herein. Optionally the product is operable at a Mach number of equal to or greater than 0.7, and further optionally a Mach number equal to or greater than 0.8, 0.9, 1.0, 1.1, 1.2, 1.3, 1.4 or 1.5.

According to an aspect there is provided a gas turbine engine comprising the low drag surface as claimed herein.

According to an aspect there is provided a method of assembling a gas turbine engine, the method comprising affixing a low drag surface as claimed herein to the gas turbine engine.

According to an aspect there is provided a method of operating the gas turbine engine as claimed herein, the method comprising operating the gas turbine engine such that a fluid flows over the surface portion and the continuously translatable surface is translated.

According to an aspect there is provided a method of designing the gas turbine engine as claimed herein. The method may comprise the step of designing the low drag surface to be operable at a Mach number of equal to or greater than 0.7, and further optionally a Mach number equal to or greater than 0.8, 0.9, 1.0, 1.1, 1.2, 1.3, 1.4 or 1.5.

According to an aspect there is provided a method of preventing ice accumulation on a gas turbine engine surface comprising a low drag surface as claimed herein, the method comprising the step of operating the gas turbine engine such that the continuously translatable surface translates such that it generates heat for preventing the accumulation of ice.

Low drag may mean that a surface has lower drag compared to if it consisted only of an aerodynamic surface. Low drag may mean that the translatable surface portion reduces skin friction on the low drag surface. Low drag may mean that the translatable surface portion alters the boundary layer across the low drag surface. The location of the surface portion may reduce the fluid drag of the low drag surface when it is fluid washed. The aerodynamic surface may be low drag. The momentum deficit in the boundary layer resulting from flow over the translatable surface portion may be lower than that which result from flow over an otherwise similar static (non-translatable) surface.

The cut out may be rectangular. The surface may or substantially fill the cut-out region. The aerodynamic surface may be curved. The aerodynamic surface may be curved in the region of the surface portion. The aerodynamic surface may have a radius of curvature. The surface portion may be shaped to correspond with the shape of the aerodynamic surface.

In use the low drag surface may receive a flow of fluid. In use the aerodynamic surface may receive a flow of fluid. The surface portion may be exposed to the flow of fluid through the cut-out region.

The surface portion may abut the aerodynamic surface. The surface portion may abut the aerodynamic surface on all sides. Lateral sides of the surface portion may abut the aerodynamic surface. Lateral sides of the surface portion may be sides that are parallel to the translatable direction. The surface portion may abut the aerodynamic surface such that a small gap exists between the surface portion and the aerodynamic surface, for example on one or more sides. The surface portion may abut the aerodynamic surface such that a small gap exists between the surface portion and the fluid washed aerodynamic surface to prevent contact and friction between the surface portion and the aerodynamic surface. The surface portion may abut the aerodynamic surface such that a small gap exists between the surface portion and the fluid washed aerodynamic surface to prevent contact and friction between the surface portion and the aerodynamic surface whilst minimising aerodynamic losses from the small gap.

The surface portion may translate relative to the aerodynamic surface in a direction coincident or substantially coincident with the direction of fluid flow over the low drag surface.

A continuously translatable surface may be a surface that can translate along a fixed path. The fixed path may be a loop. The fixed path may have a beginning and an end that are coincident. The fixed path may be static with respect to the aerodynamic surface. A continuously translatable surface may be a surface where points on the surface can translate at substantially constant velocity indefinitely. A continuously translatable surface may comprise a loop. A continuously translatable surface may be translatable around a fixed loop.

The surface portion may be a minor portion of the continuously translatable surface. The continuously translatable surface may comprise an (exposed) surface portion and an unexposed portion. The unexposed portion may be a major portion. The unexposed portion may not be fluid washed, for example in use. The unexposed portion may be located on the underside of the aerodynamic surface. A fluid washed surface on an object may feel a force from an external fluid due to the movement of the object.

The surface portion may be translatable in a single direction. The surface portion may be translatable in a plurality of directions.

The surface portion may be substantially flush with the aerodynamic surface.

Substantially flush may be flush, overflush or underflush. Overflush may be that the surface portion protrudes (for example a small amount) from the aerodynamic surface. Underflush may be that the surface portion is recessed (for example a small amount) below the aerodynamic surface. The surface portion may be overflush or underflush with the aerodynamic surface.

The surface portion may be substantially flush with the aerodynamic surface such that if it did not translate it would not have a significant impact on the surface drag and/or boundary layer. The surface portion may be substantially flush with the aerodynamic surface such that it has minimal aerodynamic impact whilst accounting for installation practicalities (for example tolerances, to account for movement during operation or avoidance of moving surfaces contacting each other).

When the surface portion has a constant radius (for example it is cylindrical or spherical), the surface portion may be substantially flush such that it protrudes above the aerodynamic surface a portion of the radius. The portion of the radius may be, for example, less than 20%, 15%, 10% or 5% of the radius, The surface portion may be flush with the aerodynamic surface across the surface portion. The surface portion may not protrude significantly from the aerodynamic surface. The surface portion may be flush with the aerodynamic surface at the edges of the surface portion. The surface portion may be overflush. The surface portion may be underflush. The surface portion may be flush with the aerodynamic surface at lateral edges, for example edges that are parallel with the direction to which the surface portion is translatable. The surface portion may be flush with the aerodynamic surface at the edges that are perpendicular to the direction to which the surface portion is translatable.

The continuously translatable surface may be rollable around an axis of rotation. The continuously translatable surface may be the radially outer surface of a roller.

The continuously translatable surface may be a roller. The continuously translatable surface may have 1 aspect of rotational symmetry. The continuously translatable surface may be spherical.

The continuously translatable surface may be the radially outer surface of a sphere.

The spherical continuously translatable surface may be housed in a multidirectional bearing. The surface portion of the spherical continuously translatable surface may translate in any direction. Advantageously a spherical continuously translatable surface can accommodate local flow from any direction. A spherical continuously translatable surface may be advantageously where the flow direction over the low drag surface changes during operation.

The continuously translatable surface comprises a skin that extends around and is rollable around a plurality of axes of rotation.

The skin may be a flexible belt. Each axis of rotation may be coincident with the rotational axis of a roller. The skin may extend over and around each roller. The skin may engage or be linked to the rollers, for example such that the skin may translate as the rollers turn. The skin may be straight in sections where it extends between the rollers. More than two rollers may shape the surface portion of the continuously translatable surface, for example to correspond to the shape of the aerodynamic surface.

Each axis of rotation may be fixed in position relative to the aerodynamic surface.

Each axis may be fixed such that whilst the continuously translatable surface translates about or around an axis the axis is stationary with respect to the aerodynamic surface. The axis may be fixed through mounting features to the non-fluid washed surface of the aerodynamic surface. The aerodynamic surface may comprise a fluid washed side and a non-fluid washed side. The non fluid washed side may face the internal structure of the moving object. The axis may be fixed relative to the internal structure of the moving object.

The low drag surface may further comprise an actuator for actuating the continuously translatable surface.

The actuator may be a motor. The actuator may comprise an actuated roller or gear that contacts the continuously translatable surface. The actuator may comprise an actuated roller or gear that drives a roller with a rotational axis coincident with an axis of rotation. The actuator may comprise an actuator that engages an axis of rotation of the continuously translatable surface. The actuator may be supplied with power. The actuator may assist the translation of the continuously translatable surface. The actuator may provide a portion of the power required to translate the continuously translatable surface. The actuator may drive the continuously translatable surface at a speed faster than the fluid flow, for example the free stream fluid flow. The free stream fluid flow may be the velocity of the fluid relative to the moving object at a distance from the moving object such that it is substantially unaffected by the moving object.

Each axis of rotation may have its own associated actuator. Each continuously translatable surface may have one or more actuators.

The actuator may be controlled by a controller. The controller may have a sensor that senses the relative speed of the fluid, for example the free stream fluid or localised fluid, compared with the moving object. The controller may control the actuator such that the continuously translatable surface translates at a speed suitable for controlling the boundary layer. For example at some relative speeds the actuator may translate the continuously translatable surface faster than the relative speed and/or at other relative speeds the continuously translatable surface may translate the continuously translatable surface slower than the relative speed.

The low drag surface may comprises a plurality of cut-out regions and/or a plurality of surface portions. Each surface portion may corresponds to and be positioned in a cut-out region. The aerodynamic surface and the plurality of surface portions may form a fluidwash surface.

The plurality of cut-out regions may be arranged in an array, and wherein optionally the number of cut-out regions may be greater than 4, 6, 8, 10, 15, 20 or 50.

The number of cut-outs and the number of surface portions may be equal. The plurality of cut-outs may be arranged such that a first cut-out experiences the aerodynamic wake of a second cut-out. The plurality of cut-outs may be arranged in a line, for example along an edge, for example along the lip of a gas turbine engine inlet. The plurality of cut-outs may be arranged in a regular array. The array may have a plurality of rows or columns. The array may evenly cover the aerodynamic surface. The distance between a first cut-out and a second cut-out (or for example each cut-out) may be of the order of (for example equal to) the size (for example a dimension of) of the cut-out. The distance between a first cut-out and a second cut-out (or for example each cut-out) may be 2, 3, 4 or 5 times the size (for example a dimension of) of the cut-out. The distance between each cut-out may be equal.

The low drag surface may be operable at a Mach number of equal to or greater than 0.7, and further optionally a Mach number equal to or greater than 0.8, 0.9, 1.0, 1.1, 1.2, 1.3, 1.4 or 1.5.

The low drag surface may be shaped to minimise losses at the associated Mach number. The Mach number may be the free stream Mach number. The Mach number may be the localised stream Mach number, for example the Mach number experienced over the low drag surface. The low drag surface may be made of robust materials suitable for the associated Mach number. The low drag surface may be designed to minimise flow disturbances experienced at the associated Mach number, for example shock at Mach numbers of 1 or greater. The power supplied to an actuator may be sufficient to drive the continuously translatable surface at the free stream velocity. The power supplied to an actuator may be sufficient to drive the continuously translatable surface at the associated Mach number. The power supplied to an actuator may be sufficient to drive the continuously translatable surface at a speed faster than the associated Mach number.

The continuously translatable surface may be arrangeable such that a forward gap exists between the aerodynamic surface and a forward edge of the surface portion and/or a rearward gap exists between the aerodynamic surface and a rearward edge of the surface portion.

Air may be forced out of the forward gap and/or air may be forced in to the rearward gap.

Air may be forced out of the forward gap using a pressure generating device such as a blower, fan or pump. Air may be forced in to the rearward gap using a suction device such as a pump or fan. The air forced out of the forward gap and/or the air forced in the rearward gap may reduce aerodynamic losses and/or control the boundary layer of the flow.

The product may be a wing of an aircraft. The product may be the hull of a ship. The aerodynamic surface may be a hydrodynamic surface (for example when the fluid is water). The fluid may be air. The fluid may be water. The product may be a vehicle. The product may be a train. The product may be a car, lorry or transporter.

The low drag surface may be located at an intake to the gas turbine engine. Optionally the low drag surface may be located at an intake lip of the intake.

The low drag surface may be located at a position where shock originates. The low drag surface may be located at a position on the intake lip where shock originates. The aerodynamic surface may be part of the gas washed surface of the gas turbine, for example the gas washed intake or intake lip.

The low drag surface is located at an external surface of a nacelle of the gas turbine engine.

The gas turbine engine may comprise a nacelle, and the step of affixing may further comprises affixing the low drag surface to a nacelle of the gas turbine engine.

The nacelle may comprises an intake, and the step of affixing may further comprise affixing the low drag surface to the inlet of the nacelle.

The force of skin friction on the surface portion from the fluid flow alone may translate the continuously translatable surface.

The step of operating the gas turbine engine may further comprise actuating the actuator to translate the continuously translatable surface.

The method of operating a gas turbine engine may further comprise operating the gas turbine engine at a Mach number of equal to or greater than 0.7, 0.8, 0.9, 1.0, 1.1, 1.2, 1.3, 1.4 or 1.5.

The continuously translatable surface may be arranged such that on operating the gas turbine engine the continuously translatable surface translates in a direction that is substantially coincident with the direction of localised fluid flow. Localised fluid flow is flow that is near or adjacent the continuously translatable surface.

The continuously translatable surface may rotate or roll around a low friction rotational axis. The continuously translatable surface may rotate or roll around a roller that is mounted via low friction bearings. The continuously translatable surface may be a roller that is mounted via low friction bearings. The continuously translatable surface may have low resistance to translation, for example relative to the force exerted by skin friction. Skin friction may be the aerodynamic force exerted by the localised flow. The continuously translatable surface may have surface features or a surface profile that assists in being driven or driving the localised flow.

The friction caused by the rotation of rollers of the continuously translatable surface may generate heat that prevents ice accumulation. The friction caused by interaction between the continuously translatable surface and the aerodynamic surface may generate heat that prevents the accumulation of ice.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

Embodiments will now be described by way of example only, with reference to the Figures, in which.

DETAILED DESCRIPTION OF THE DISCLOSURE

Figure 1:
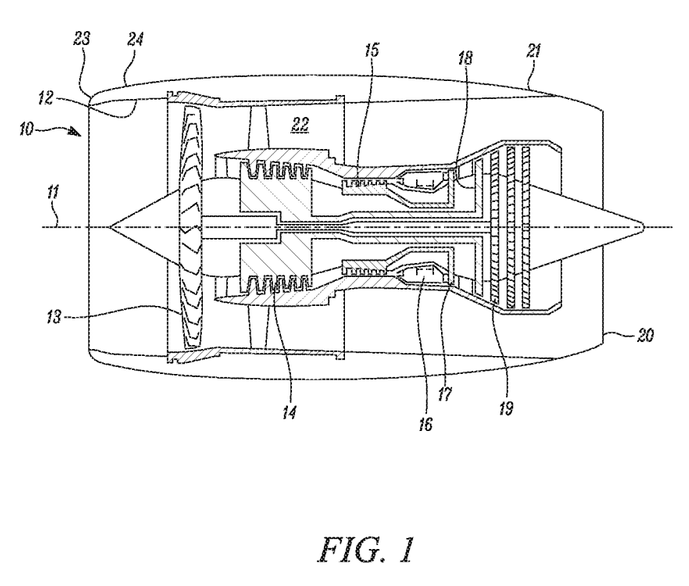
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20. The intake 12 comprises an intake lip 23. The nacelle 21 comprises a nacelle outer surface 24.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

Figure 2:
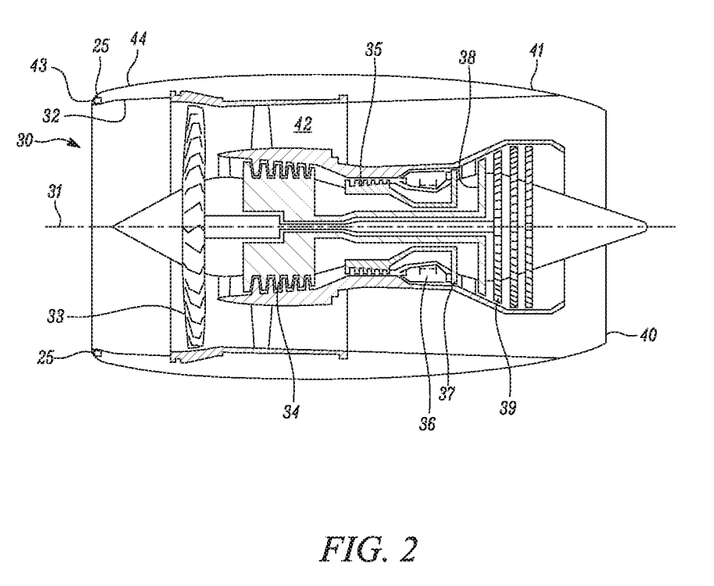
FIG. 2 is a sectional side view of a gas turbine engine comprising a low drag surface.

FIG. 2 shows a gas turbine engine of similar configuration to FIG. 1. A gas turbine engine is generally indicated at 30, having a principal and rotational axis 31. The engine 30 comprises, in axial flow series, an air intake 32, a propulsive fan 33, an intermediate pressure compressor 34, a high-pressure compressor 35, combustion equipment 36, a high-pressure turbine 37, an intermediate pressure turbine 38, a low-pressure turbine 39 and an exhaust nozzle 40. A nacelle 41 generally surrounds the engine 30 and defines both the intake 32 and the exhaust nozzle 40. The intake 32 comprises an intake lip 43. The nacelle 41 comprises a nacelle outer surface 44. A low drag surface 25 as claimed herein is positioned at the intake lip 43 in the FIG. 2 example.

Figure 3:
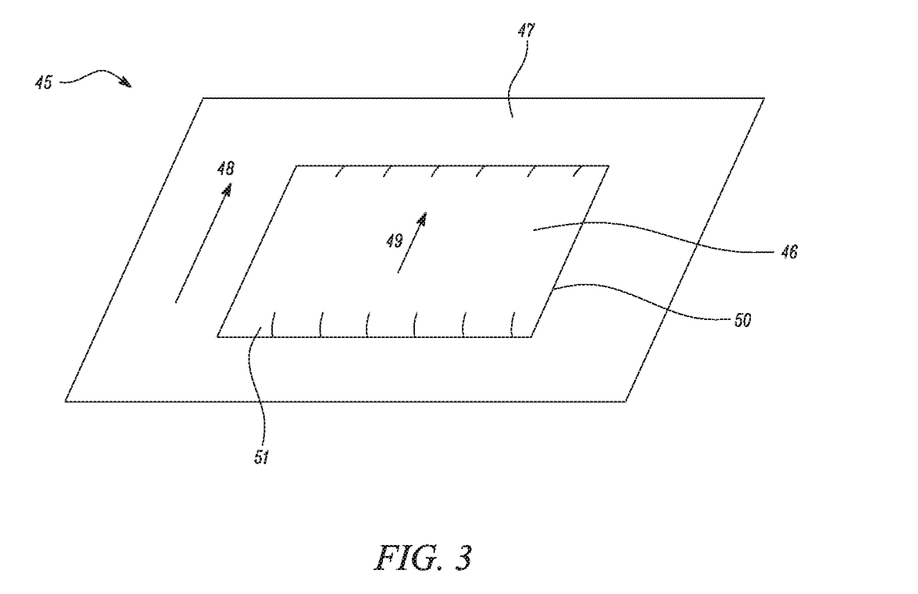
FIG. 3 is an isometric schematic of a low drag surface.

FIG. 3 shows an example of an isometric schematic view of a low drag surface 45 as claimed herein. FIG. 3 shows an aerodynamic surface 47. A cut-out region 50 is shown. A surface portion 46 of a continuously translatable surface 51 is arranged in the cut-out region 50. The surface portion 46 is translatable direction 49. The direction of localised fluid flow 48 is shown.

The cut-out region 50 is rectangular in the FIG. 3 example. In the FIG. 3 example the continuously translatable surface 51 is a skin. The surface portion 46 substantially fills the cut-out region 50. The surface portion 46 is substantially rectangular. The continuously translatable surface 51 is translatable relative to the aerodynamic surface 47. The continuously translatable surface 51 may translate in the direction 49 whereas the aerodynamic surface 47 is fixed in position and/or cannot translate in the direction 49.

Skin friction from flow flowing in the direction of localised fluid flow 48, or substantially in the direction of localised fluid flow 48, exerts a force on the surface portion 46 in the direction 49. This force may translate the continuously translatable 46 in the direction 49. This force may translate the surface portion 46 in the direction 49. As the surface portion 46 translates, a new portion of the continuously translatable surface 51 is exposed to the fluid flow. The aerodynamic surface 47 and the surface portion 46 together form a fluidwash surface. As the continuously translatable surface 51 translates, it may alter the boundary condition over the fluidwash surface. As the continuously translatable surface 51 translates, it may reduce the skin friction across the fluidwash surface.

Figure 4:
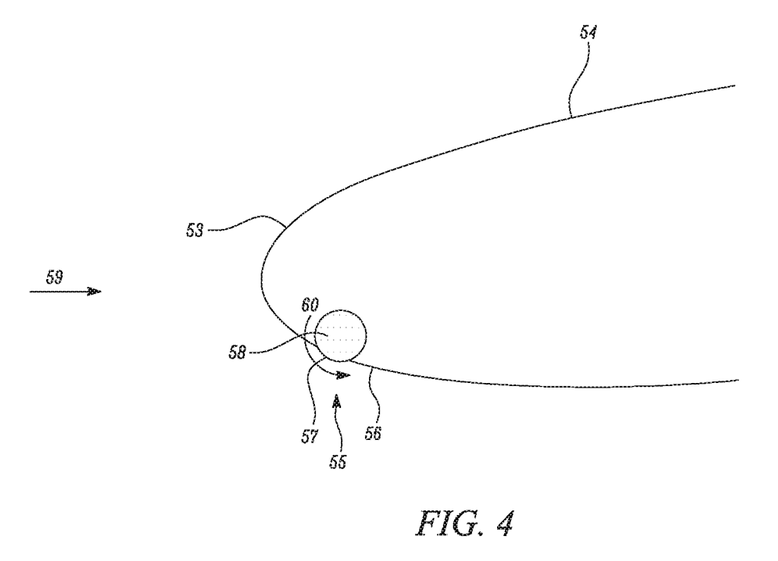
FIG. 4 is a sectional side view of the inlet of a gas turbine engine comprising a low drag surface comprising a roller.

FIG. 4 shows the inlet lip 53 of a gas turbine engine nacelle 54. A low drag surface 55 is schematically shown arranged at the inlet lip 53. FIG. 4 shows an aerodynamic surface 56 and a continuously translatable surface 52 that comprises a surface portion 57. The continuously translatable surface 52 is the outer surface of a roller 58. The roller 58 rolls around an axis of rotation in a direction 60. The roller 58 can roll continuously around the axis of rotation.

The roller 58 has an aspect of rotational symmetry. The roller 58 does not protrude significantly from the aerodynamic surface 56. The aerodynamic surface 56 has a curvature in the region of the surface portion 57. In the FIG. 4 example, the surface portion 57 has a greater radius of curvature than the aerodynamic surface 56. The surface portion 57 is small compared to the size of the continuously translatable surface 52 to ensure that the surface portion is substantially flush with the aerodynamic surface 56 in the FIG. 4 example. The remainder of the continuously translatable surface 52 that isn't the surface portion 57, for example an unexposed portion, faces the internal structure of the nacelle.

As the gas turbine engine is operated, the nacelle 54 receives fluid flow 59. The fluid flow 59 may cause high Mach numbers around the inlet lip 53, for example greater than 0.9 and for example up to 1.5, or 1.52. This can cause fluid shock to propagate from the inlet lip 53 which can affect downstream components of the gas turbine engine. In the FIG. 4 example, the low drag surface is positioned at a point where high Mach numbers, and shock may propagate from. In the FIG. 4 example, the upper side of the inlet lip 53, with respect to the figure image, is an outer surface of the nacelle 54 and the lower side of the inlet lip 53, with respect to the figure image, is an inner surface of the nacelle 54.

Figure 5:
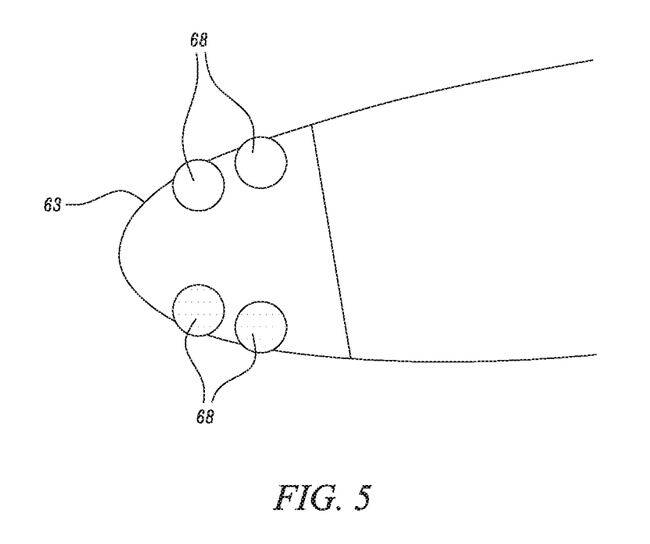
FIG. 5 is a sectional side view of the inlet of a gas turbine engine comprising a plurality of low drag surface.

FIG. 5 shows a similar arrangement to FIG. 4. FIG. 5 shows an inlet lip 63 and a plurality of rollers 68. Each of the plurality of rollers forms a low drag surface in a similar manner to as shown in FIG. 4. The nacelle includes an internal partition in the FIG. 5 example. Such an internal partition may provide a separate compartment local to the inlet lip, for example. In other examples partitions may be alternatively arranged.

Figure 6:
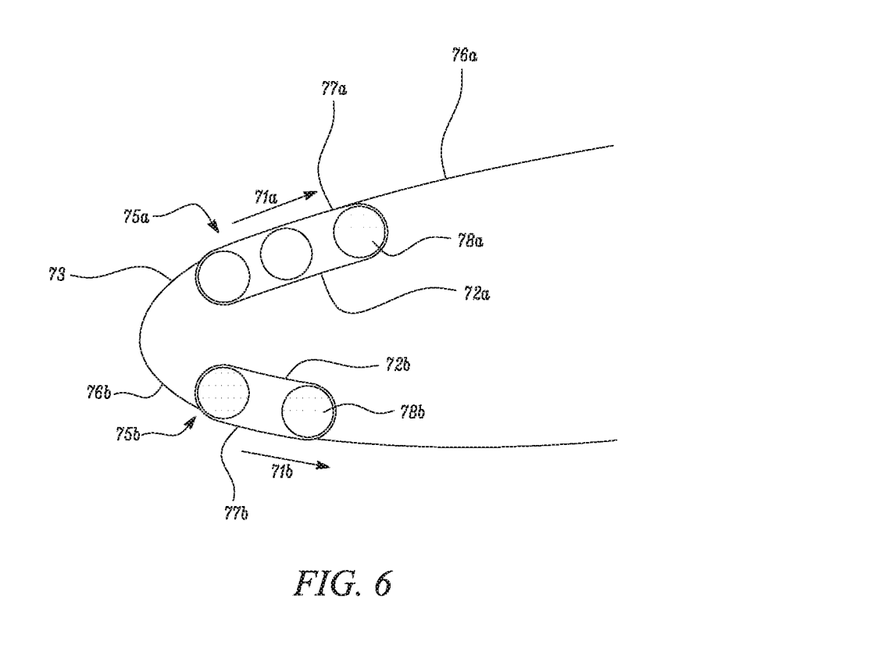
FIG. 6 is a sectional side view of the inlet of a gas turbine engine comprising a low drag surface comprising a skin.

FIG. 6 shows alternative embodiments of the low drag surface 75a, 75b as claimed herein. FIG. 6 shows a first low drag surface embodiment 75a and a second low drag surface embodiment 75b. The first low drag surface embodiment 75a is located on the outside of the nacelle and the second low drag surface embodiment 75b is located on the inside of the nacelle. FIG. 6 shows an inlet lip 73.

The first low drag surface embodiment 75a has a continuously translatable surface 72a comprising a surface portion 77a, and an aerodynamic surface 76a. In the FIG. 6 example the continuously translatable surface 72a extends around a plurality of rollers 78a.

The second low drag surface embodiment 75b has a continuously translatable surface 72b comprising a surface portion 77b, and an aerodynamic surface 76b. In the FIG. 6 example the continuously translatable surface 72b extends around a plurality of rollers 78b.

In the FIG. 6 example, the continuously translatable surfaces 77a and 77b are skins. The continuously translatable surfaces 77a and 77b may be flexible belts. The low drag surfaces 75a, 75b may resemble the low drag surface 45 of FIG. 3 when viewed from a different angle.

Considering the first low drag surface embodiment 75a, the continuously translatable surface 72a can proceed around the plurality of rollers 78a. The continuously translatable surface 72a is shown interacting with the rollers 78a schematically, and may for example be in frictional contact with the rollers such that as the continuously translatable surface 72a translates the rollers 78a rotate correspondingly.

The arrangement of the continuously translatable surface 72a and the rollers 78a may be such that the surface portion 77a follows the contours of the aerodynamic surface 76a. In order to achieve this, more than two rollers may be required, as in the first low drag surface embodiment 75a. This is because where the continuously translatable surface is a flexible belt it will be straight between rollers when under tension, and so if only two rollers are used, for example in the second low drag surface 75b, it is more difficult to achieve a radius of curvature in the surface portion 77b.

Localised flow 71a and 71b flows over the low drag surfaces 75a and 75b. As the localised flow 71a, 71b flows over the corresponding surface portion 77a, 77b the shear forces in the flow may exert a force on the surface portion 77a, 77b that translates it, subsequently turning the corresponding rollers 78a, 78b.

The rollers 78a, 78b are arranged such that each roller has an axis of rotation at its centre about which it rotates. Each axis of rotation is fixed relative to the nacelle, for example the inlet lip 73 or the aerodynamic surface 76a, 76b. The aerodynamic surface is part of the gas washed surface of the nacelle.

Figure 7:
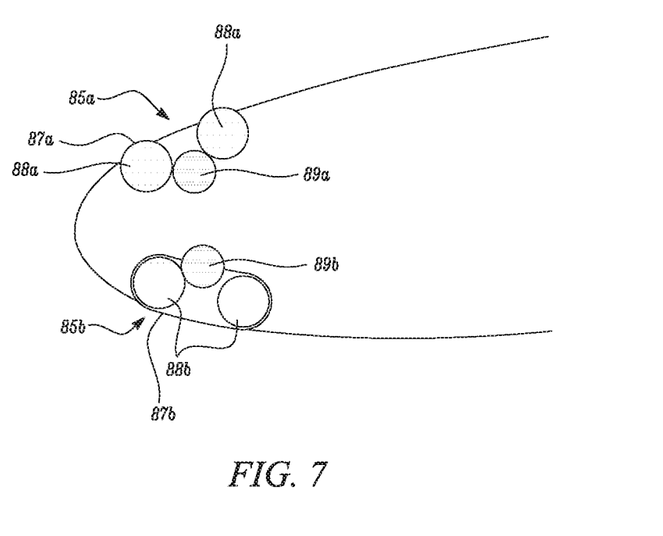
FIG. 7 is a sectional side view of the inlet of a gas turbine engine showing the actuation of low drag surfaces in various configurations.

FIG. 7 shows further examples of the low drag surface 85a, 85b claimed herein. In the low drag surface 85a embodiment, a plurality of rollers 88a are arranged, each with a continuously translatable surface 87a in a similar manner to, for example the example of FIG. 4. In the low drag surface 85b embodiment, a plurality of rollers 88b are arranged, and a continuously translatable surface 87b is a skin that extends around the rollers 88b in a similar manner to, for example, the examples of FIG. 6.

In both the low drag surface 85a embodiment and the low drag surface 85b embodiment an actuator 89a, 89b is present. In the FIG. 7 example the actuator 89a is in contact with, and drives the rollers 88a. In other embodiments the actuator 89a may only be in contact with one of the rollers 88a and a separate actuator, not shown, may be in contact with the other, or other, rollers. In the FIG. 7 example the actuator 89b is in contact with one of the rollers 88a. In other embodiments the actuator 89b may be in contact with both rollers 88b or more than one roller.

The actuators may be motors. Alternatively the actuators may be gears, for example driven by motors or other driving components. The actuators may be in frictional contact with the roller surface or an axle of the roller.

A method of operating a gas turbine engine will now be described with respect to the figures. The gas turbine engine is operated such that fluid flows into the intake of the gas turbine engine, for example inside the intake lip. An example of the free stream fluid flow is shown as fluid flow 59 in FIG. 4. The gas turbine engine may be at altitude, for example cruise altitude, when operated in such a way. When operated at altitude, the free stream flow may be at a high Mach number, for example up to 0.9, relative to the gas turbine engine. Alternatively the gas turbine engine may be operated in a test, for example at ground level, where the gas turbine engine is static relative to the ground and air is sucked into the inlet.

As air flows over the inlet it interacts with the surface portions of the continuously translatable surface. The skin friction or shear forces in the flow can apply a force to the surface portion that translates it rearwards. The continuous translation of the continuously translatable surface provides a region of the gas turbine where the relative velocity between a localised flow and the gas turbine surface is reduced compared to if the continuously translatable surface were not present.

The method of operating the gas turbine engine may comprise the step of actuating an actuator to translate the continuously translatable surface. For example, with respect to the FIG. 7 examples the actuator may drive a roller surface or axle.

The axles of rollers may be mounted to the object structure, for example the underside of the aerodynamic surface or the object structure, for example the gas turbine inlet, using low friction bearings. This minimises the resistance of the continuously translatable surface to translation. However some resistance may still be present, or may be designed in. In such a scenario, as the continuously translatable surface translates, heat is generated due to the resistance to translation. In a method of preventing ice accumulation this heat may prevent the accumulation of ice in the region around the low drag surface.

Figure 8:
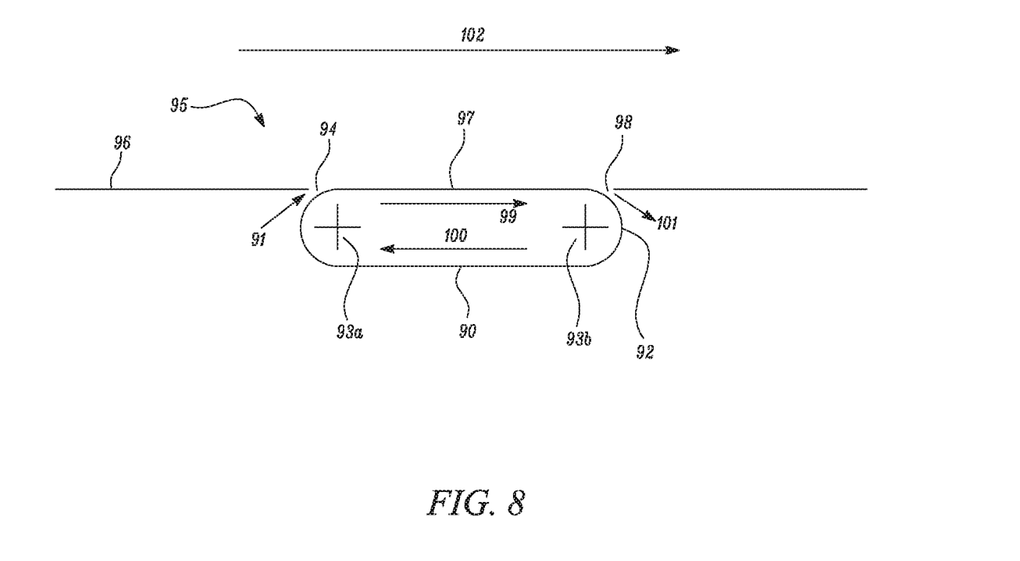
FIG. 8 is a schematic sectional side view of a low drag surface.

FIG. 8 shows a schematic section side view of a low drag surface 95. The low drag surface 95 may be of similar configuration to that shown in the FIG. 3 example. The low drag surface 95 has an aerodynamic surface 96 and a continuously translatable surface 92 comprising a surface portion 97 and an unexposed portion 90. The continuously translatable surface 92 is a skin that rotates around two axis of rotation 93a, 93b. A forward gap 94 and rearward gap 98 exists between the continuously translatable surface 92 and the aerodynamic surface 96.

As the low drag surface 95 is operated and experiences a free stream flow 102, the surface portion 97 may translate in the rearward direction 99 and the unexposed portion 90 may generally translate in the forward direction 100. A forward airflow 91 may exit the forward gap 94 to join the external flow. A rearward airflow 101 may enter the area below the aerodynamic surface 96, for example the internal structure of the moving object. The forward airflow 91 may be assisted by a pressure device such as a pump or blower. The rearward airflow 101 may be assisted by a suction device such as a pump. The forward airflow 91 and/or the rearward airflow 101 may assist in reducing shear forces in the flow above the low drag surface 95 and/or alter the boundary flow downstream of the surface portion 97.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

I claim:

1. An apparatus comprising:
a gas turbine engine; and
a low drag surface for a fluid washed object, the low drag surface being disposed on the gas turbine engine and comprising:
an aerodynamic surface comprising a cut-out region, and
a cylindrical or spherical roller with a continuously translatable surface comprising a surface portion, the cylindrical or spherical roller being directly exposed to an ambient atmosphere, wherein
the surface portion is positioned in the cut-out region such that the aerodynamic surface and the surface portion form a fluidwash surface, the surface portion is translatable relative to the aerodynamic surface, and the surface portion substantially fills the cut-out region,
wherein the low drag surface is located at an interior side of an intake to a nacelle of the gas turbine engine.

2. The apparatus according to claim 1, wherein the surface portion is substantially flush with the aerodynamic surface.

3. The apparatus according to claim 1, wherein the continuously translatable surface is a radially outer surface of a sphere.

4. The apparatus according to claim 1, wherein
the continuously translatable surface is rotatable around an axis of rotation, and the axis of rotation is fixed in position relative to the aerodynamic surface.

5. The apparatus according to claim 1, the low drag surface further comprising an actuator for actuating the continuously translatable surface.

6. The apparatus according to claim 1, wherein the continuously translatable surface is arranged such that a forward gap exists between the aerodynamic surface and a forward edge of the surface portion and/or a rearward gap exists between the aerodynamic surface and a rearward edge of the surface portion, and wherein air is forced out of the forward gap and/or air is forced in to the rearward gap.

7. The apparatus according to claim 1, wherein the low drag surface comprises a plurality of cut-out regions and a plurality of surface portions, wherein each surface portion corresponds to and is positioned in a cut-out region, and wherein the aerodynamic surface and the plurality of surface portions form a fluidwash surface.

8. The apparatus according to claim 7, wherein the plurality of cut-out regions are arranged in an array.

9. The apparatus according to claim 8, wherein a number of cut-out regions is greater than 4.

10. The apparatus according to claim 1, wherein another low drag surface is located at an external surface of the nacelle of the gas turbine engine.

11. The apparatus according to claim 1, wherein the low drag surface is one of a plurality of low drag surfaces, each of the plurality of low drag surfaces comprising the aerodynamic surface, the cut-out region, and the cylindrical or spherical roller with the continuously translatable surface comprising the surface portion, and
the plurality of low drag surfaces are (i) located at the interior side of the intake to the nacelle of the gas turbine engine, and (ii) arranged sequentially along an axial direction of the gas turbine engine.

12. The apparatus according to claim 1, wherein the low drag surface is one of a plurality of low drag surfaces, each of the plurality of low drag surfaces comprising the aerodynamic surface, the cut-out region, and the cylindrical or spherical roller with the continuously translatable surface comprising the surface portion, and
the plurality of low drag surfaces are (i) located at the interior side of the intake to the nacelle of the gas turbine engine, (ii), located at an external side of the nacelle, and (iii) arranged sequentially along an axial direction of the gas turbine engine.

13. A method of operating an apparatus comprising a gas turbine engine, the apparatus further comprising a low drag surface for a fluid washed object, the low drag surface being disposed on the gas turbine engine, the apparatus further comprising an aerodynamic surface comprising a cut-out region, and a cylindrical or spherical roller with a continuously translatable surface comprising a surface portion, the cylindrical or spherical roller being directly exposed to an ambient atmosphere, wherein the surface portion is positioned in the cut-out region such that the aerodynamic surface and the surface portion form a fluidwash surface, the surface portion is translatable relative to the aerodynamic surface, and the surface portion substantially fills the cut-out region, the method comprising:
operating the gas turbine engine such that a fluid flows over the surface portion and the continuously translatable surface is translated,
wherein the low drag surface is located at an interior side of an intake to a nacelle of the gas turbine engine.

14. The method according to claim 13, wherein a force of skin friction on the surface portion from the fluid flow alone translates the continuously translatable surface.

15. The method according to claim 13, wherein the step of operating the gas turbine engine further comprises actuating an actuator to translate the continuously translatable surface.

16. The method according to claim 13, wherein the method further comprises operating the gas turbine engine at a Mach number of equal to or greater than 0.7.

17. The method of operating the apparatus according to claim 16, wherein the method further comprises operating the gas turbine engine at a Mach number of equal to or greater than 0.8.

18. The method according to claim 13, the method further comprising operating the gas turbine engine such that the continuously translatable surface translates such that it generates heat for preventing the accumulation of ice.

19. The method according to claim 13, wherein another low drag surface is located at an external surface of the nacelle of the gas turbine engine.

* * * * *